(12) United States Patent
Kreuzer

(10) Patent No.: US 11,208,202 B2
(45) Date of Patent: Dec. 28, 2021

(54) FLOW BODY OF AN AIRCRAFT AND AIRCRAFT

(71) Applicant: Airbus Operations GmbH, Hamburg (DE)

(72) Inventor: Peter Kreuzer, Hamburg (DE)

(73) Assignee: Airbus Operations GmbH

( * ) Notice: Subject to any disclaimer, the term of this patent is extended or adjusted under 35 U.S.C. 154(b) by 121 days.

(21) Appl. No.: 16/518,033

(22) Filed: Jul. 22, 2019

(65) Prior Publication Data

US 2020/0031455 A1 Jan. 30, 2020

(30) Foreign Application Priority Data

Jul. 30, 2018 (DE) ...................... 10 2018 118 343.7

(51) Int. Cl.
*B64C 21/06* (2006.01)

(52) U.S. Cl.
CPC .......... *B64C 21/06* (2013.01); *B64C 2230/06* (2013.01)

(58) Field of Classification Search
CPC .... B64C 2230/20; B64C 21/06; B64C 21/025
See application file for complete search history.

(56) References Cited

U.S. PATENT DOCUMENTS

| | | | | |
|---|---|---|---|---|
| 2,646,945 A | * | 7/1953 | Perry | B64C 21/025 244/204 |
| 3,144,220 A | * | 8/1964 | Kittelson | B64C 23/00 244/203 |
| 5,167,387 A | * | 12/1992 | Hartwich | B64C 21/025 244/200 |
| 5,366,177 A | * | 11/1994 | DeCoux | B64C 21/06 244/201 |
| 8,245,976 B2 | * | 8/2012 | Sakurai | B64C 21/02 244/129.5 |
| 9,623,959 B2 | * | 4/2017 | Schrauf | B64C 21/06 |
| 2016/0159465 A1 | | 6/2016 | Koppelman et al. | |
| 2018/0194457 A1 | | 7/2018 | Gueuning et al. | |

FOREIGN PATENT DOCUMENTS

| | | |
|---|---|---|
| CN | 207292381 U | 5/2018 |
| DE | 10 2013 226935 A1 | 6/2015 |
| EP | 0532093 A1 | 3/1993 |
| EP | 3199450 A1 | 8/2017 |

* cited by examiner

*Primary Examiner* — Richard R. Green
*Assistant Examiner* — Madison Elizabeth Dittner
(74) *Attorney, Agent, or Firm* — Lerner, David, Littenberg, Krumholz & Mentlik, LLP

(57) ABSTRACT

A flow body of an aircraft includes: a flow surface exposed to an airstream during flight of the aircraft, the flow surface generating at least one region of turbulent airflow during flight of the aircraft, at least one perforated area including a plurality of openings extending through the flow surface, a manifold positioned interior to the flow surface in fluid communication with the openings, and at least one suction duct having a first end and a second end, the first end being in fluid communication with the manifold, the second end including a suction opening and being arranged in the at least one region of turbulent airflow, wherein the suction opening is adapted for inducing a suction force in the at least one suction duct when the flow surface is exposed to an airstream during flight, thereby inducing a flow of air from through the plurality of openings.

11 Claims, 3 Drawing Sheets

FLOW BODY OF AN AIRCRAFT AND AIRCRAFT

FIELD OF THE INVENTION

The invention relates to a flow body comprising a flow surface exposed to an airstream during flight of an aircraft, and an aircraft comprising the flow body.

BACKGROUND OF THE INVENTION

Flow bodies provide a lift producing force and drag forces for aircraft during flight in air. The drag forces produced by a flow body may in part be reduced when the airstream which flows around the flow body stays laminar. Hybrid Laminar Flow Control (HLFC) systems may be used to increase and control laminarity of the air flow around a flow body and therefore may be used to decrease drag forces. HLFC systems enable drag reduction by means of providing suction of the boundary layer airflow of the flow body. This results in increased laminar flow and therefore significantly reduced friction drag on the aerodynamic surfaces of the flow body. The suction created by HLFC systems can be provided by passive means using for example an low pressure area source or by active means using for example a suction pump.

EP 3 199 450 A1 describes an example of a passive HLFC system in which a chamber is arranged on a leading edge of an aerofoil. Perforations in the leading edge provide openings to the chamber. A pipe which extends along the chamber is connected to a suction opening being arranged in a low-pressure area during flight. Suction being induced at the suction opening induces an airflow through the pipe from the perforations to the pipe. BRIEF SUMMARY OF THE INVENTION There may be the need for providing a flow body comprising an improved airflow.

According to an embodiment of the invention, a flow body of an aircraft comprises a flow surface exposed to an airstream during flight of the aircraft, the flow surface generating at least one region of turbulent airflow during flight of the aircraft, at least one perforated area comprising a plurality of openings extending through the flow surface, a manifold positioned interior to the flow surface in fluid communication with the openings, and at least one suction duct having a first end and a second end, the first end being in fluid communication with the manifold, the second end comprising a suction opening and being arranged in the at least one region of turbulent airflow, wherein the suction opening is adapted for inducing a suction force in the at least one suction duct when the flow surface is exposed to an airstream during flight, thereby inducing a flow of air from through the plurality of openings.

An embodiment of the invention provides a passive HLFC system having at least one suction duct sucking out air from a manifold of a flow body, wherein the suction opening of the suction duct is arranged in a region of turbulent airflow in proximity to the surface of the flow body. Due to a positioning of the suction opening inside the at least one region of turbulent airflow, disturbances in the remaining laminar flow being produced by the suction duct and/or suction opening are minimized. This avoids an outlet being placed in an area where laminar flow could otherwise be achieved and avoids increase of regions of turbulent airflow at the flow surface. Hence, that positioning of the at least one suction duct provides least influence on the laminar region, thereby reducing drag losses due to turbulences generated by the at least one suction duct.

The region of turbulent airflow may be induced by the flow surface itself during flight, e.g. by the leading edge or by components of the flow body protruding from the flow surface. The suction opening is in fluid communication with the manifold through the suction duct. The suction force being induced at the suction opening during flight by the airstream along the flow surface causes a flow of air from the manifold through the suction duct and the suction opening. This causes an airflow through the plurality of openings of the perforated area into the manifold. The ingestion of some of the boundary layer through the perforations, i.e. the plurality of openings, reduces the thickness of the boundary layer, therefore establishing or enhancing the laminarity of the airflow.

According to an example, wherein the flow body comprises a plurality of suction ducts.

In that example, suction is provided at a plurality of suction openings such that a failure of a single suction duct does not lead to total failure of the HLFC system. If one of the plurality of suction ducts fails, the remaining still working suction ducts may maintain the airflow through the openings of the perforated area. Hence, the airflow between the openings of the perforated area and the suction opening is improved.

According to an example, the flow surface generates a plurality of regions of turbulent airflow during flight of the aircraft being spaced apart from each other and wherein the plurality of suction ducts is arranged in a separate of the plurality of regions of turbulent airflow.

The suction ducts and thus the suction openings may be arranged so that they are spaced apart from each other in regions of turbulent airflow that are themselves spaced apart from each other. The regions of turbulent airflow may be associated to the suction ducts in a one-to-one manner. This means that each suction duct is arranged in its own region of turbulent airflow. This reduces the effects of turbulences being generated by the suction ducts, further.

According to an example, the manifold comprises a plurality of manifold sections, wherein each of the plurality of manifold sections is arranged on a separate portion of the at least one perforated area. According to a further example, the plurality of suction ducts and the plurality of manifold sections are associated to each other in a one-to-one ratio.

A special pipe system extending through the manifold which guides air from spaces being arranged far away from the first ends of the suction ducts is not required since the plurality of suction ducts may be arranged such that the whole manifold is covered by their suction force. Each manifold section may be covered by a first end of a suction duct to provide a sufficient flow of air through all openings of the perforated area.

According to an example, the manifold sections are separated by walls.

Due to the walls between the manifold sections, independent airflows may flow through the manifold sections. Each manifold section channels the airflow between the section of the perforated area on which the manifold section is arranged on and the suction duct which is connected to the manifold section. This improves the airflow through the manifold sections due to less turbulences inside the manifold.

According to a further example, the walls provide an airtight sealing between the manifold sections.

The airtight sealing between the manifold sections denies any airflow between the manifold sections. This further improves the airflow through the openings of the perforated area and the manifold sections.

According to an example, the at least one suction duct comprises a cross section which is adapted to a pressure value at a position of the suction opening in the region of turbulent airflow.

Hence, the suction duct can be optimized for the required air mass flow for the position on which the suction duct is arranged on. Also, if more than one suction ducts are provided, every suction duct may be optimized according to its position in the region of turbulent airflow. Thus, suction ducts which are arranged in regions which have a lower pressure than further regions in which further suction ducts are arranged in may have a smaller cross section than the further suction ducts. This reduces the weight of those suction ducts and adapts the airflow through the suction ducts to the local pressure. Furthermore, this may adapt a pressure distribution in the manifold such that the airflow through all openings of the perforated area may be adapted to the airflow that is locally required at the respective opening of the perforated area. This improves the airflow in the flow body and the manifold, further.

According to an example, the flow surface comprises a turbulence generating structure that generates the at least one region of turbulent airflow.

A turbulence generating structure may be any element on the flow surface which may influence the airstream at the flow surface during flight. While such turbulence generating structures may be inherently necessary for the design of the flow body itself, they may be disadvantageous as they disturb the laminar air flow coming into contact with them and making the airflow turbulent. Such turbulence generating structures may be in the form of one or more skin-cut outs for an actuation elements (e.g. slat cut outs) or other non-flush structures such as removable access panels, rivets, fasteners or gaps or steps at the intersection of adjacent components (e.g. skin panels, fairings, pylons etc.). The turbulence generating structure may also comprise an turbulence generating element that is attachable to the flow body in order to alter the lift and drag characteristics of the flow body during certain flight regimes. Example include turbulators, vortex generators, strakes. The leading edge of an aerofoil such as an aircraft wing, a winglet, a horizontal or vertical tailplane, may be a turbulence generating structure, too.

According to an example, the flow body may be an aerofoil such as an aircraft wing, a winglet, a vertical tailplane, or horizontal tailplane. According to a further example, the flow body may comprise a leading edge which faces the airstream during flight, wherein the at least one perforated area is arranged at the leading edge.

According to an example, the flow body is an aerofoil comprising a lift enhancement device being arrangeable in the manifold, wherein the lift enhancement device preferably is a Krueger lift enhancement device.

Thus, the space in which the lift enhancement device is stored during flight may be used a part of the manifold. The manifold may thus be multifunctional such that space and weight may be saved.

According to an embodiment of the invention, also an aircraft is provided comprising at least one flow body according to the description above.

The effects and further embodiments of an aircraft according to the present invention are analogous to the effects and embodiments of the description mentioned above. Thus, it is referred to the above description of the flow body.

BRIEF DESCRIPTION OF THE DRAWINGS

In the following the invention is described by the means of an exemplary embodiment using the attached drawing.

DETAILED DESCRIPTION

Figure 1:
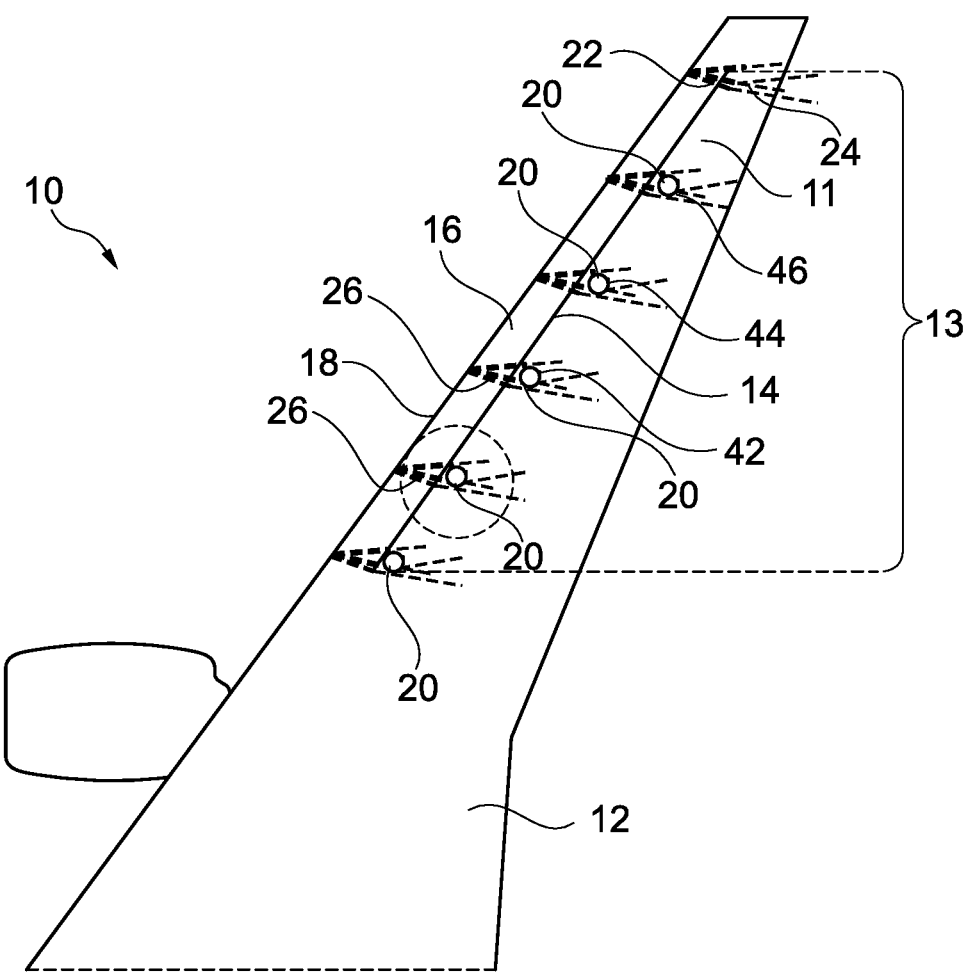
FIG. 1 shows an aircraft wing as a flow body according to an embodiment of the invention.

According to FIG. 1, the flow body in its entirety is denoted with the reference sign 10. The flow body 10 may be a component of a passive HLFC system.

Flow body 10 may be arranged on a leading edge 18 of an aircraft wing 12. The leading edge 18 faces the airstream during flight. However, flow body 10 may also be arranged at a different portion of an aircraft wing 12 or at a different lift producing element of an aircraft 40.

The flow body 10 comprises a flow surface 11 which is exposed to an airstream during flight of an aircraft. This means that the airstream flows along the flow surface 11 during flight, i.e. the flow surface 11 may be an outer skin of the aircraft wing 12.

When the flow surface 11 is exposed to the airstream during flight, the flow surface 11 may cause the airstream to provide a lift force which lifts the aircraft 40.

The flow surface 11 may comprise at least one perforated area having a plurality of openings 32 in a region 13 in which the airstream along the flow surface 11 shall stay laminar. The openings 32 may be a component of a passive HLFC system to control the laminar flow of the airstream flowing along the flow surface 11.

Furthermore, the flow body may comprise a manifold 14 being arranged below the flow surface 11, i.e. interior of the flow surface 11. The openings 32 are in fluid communication with the manifold 14. This means, the openings 32 connect the manifold 14 to the airstream flowing along the flow surface 11.

In the example provided in FIG. 1, the flow body 10 further comprises a plurality of suction openings 20 which are in fluid communication with the manifold 14. The suction openings 20 are adapted for inducing a suction force when they are exposed to the airstream during flight. This suction force induces the flow of air which flows through the openings 32, the manifold 14 and the suction openings 20. However, the flow body 10 may also comprise only a single suction opening 20.

The induction of the suction force may be caused at the suction openings 20 since they are arranged in an area of the airstream on the flow surface 11 which has a lower pressure than the pressure in the manifold 14 due to the air streaming across the suction openings 20. In an example, the suction openings 20 may be Venturi nozzles which are driven by the airstream during flight.

This flow of air reduces the pressure at the perforated area such that the airstream flowing along the flow surface 11 in the perforated area is pulled towards the flow surface 11 in the perforated area. This pulling of the airstream to the flow surface 11 maintains a boundary layer thickness suitable for laminar flow conditions of the airstream.

The suction openings 20 are arranged in regions 24 of turbulent airflow. Those regions 24 of turbulent airflow are generated by the flow surface 11 during flight. The flow surface 11 may comprise turbulence generating structures 22 which may for example be rivets or edges of shells which provide the outer skin of the aircraft wing 12.

The manifold 14 may be divided in a plurality of manifold sections 16. Walls 26 may separate the manifold sections 16 from each other. The separation by the walls 26 may be provided in an airtight manner, i.e. in this case, no airstream flows between the manifold sections 16.

Each manifold section 16 is in fluid communication with a separate portion of the perforated area and the openings 32 therein.

Furthermore, each manifold section 16 is in fluid communication with a separate suction opening 20. This means that a suction opening 20 may be connected to only one manifold section 16, i.e. in a one-to-one manner. Thus, a flow of air through an opening 32 into a manifold section 16 travels through the manifold section 16 and the separate suction opening 20 being in fluid communication with that manifold section 16.

In case that a plurality of suction openings 20 is provided, if one of the suction openings 20 fails, only a portion of the manifold 14 will stop to provide a laminar control of the airstream flowing along the flow surface 11.

Figure 2:
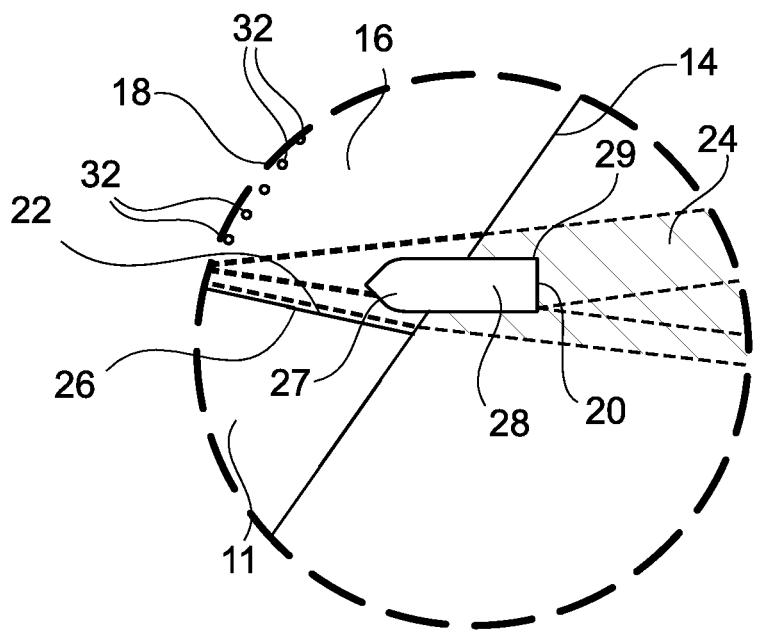
FIG. 2 shows a detail of the flow body shown in FIG. 1.

FIG. 2 shows a detail of the flow body 10 of FIG. 1. In FIG. 1 this detail is marked by the dashed line circle.

FIG. 2 shows the perforated area at the leading edge 18 having openings 32 which are in fluid communication with one of the manifold sections 16. The suction opening 20 which is in fluid communication with the manifold section 16 may be arranged on a suction duct 28. The suction duct 28 comprises a first end 27 and a second end 29. The suction opening 20 is arranged on the second end 29. The first end 27 is in fluid communication with the manifold section 16, i.e. with the manifold 14. Hence, air may stream from the manifold section 16 through the first end 27 to the second end 29 and through the suction opening 20.

The wall 26 may for example be fixed at the flow surface 11 with rivets. Those rivets may be turbulence generating structures 22 which generate a region 24 of turbulent airflow during flight. That region 24 of turbulent airflow may be cone-shaped with the tip of the cone pointing in the upstream direction of the airstream flowing along the flow surface 11.

The suction duct 28 and the suction opening 20 are arranged in that region 24 of turbulent airflow. This means, that any turbulence being generated by the suction duct 28 or the suction opening 20 will appear in the region 24 of turbulent airflow being caused by the turbulence generating structures 22. Thus, the turbulences being generated by the suction duct 28 or the suction opening 20 do not add any further region of turbulent airflow to the airstream flowing along the flow surface 11.

Since the flow body 10 may comprise a plurality of walls 26 to separate the plurality of manifold section 16 in the manifold 14, a plurality of turbulence generating structures 22 may be present on the flow surface 11. This means, a plurality of regions 24 of turbulent airflow being spaced apart from each other may be present in the airstream on the flow surface 11.

If more than one region 24 of turbulent airflow is present in the airstream flowing along the flow surface 11, the suction openings 20 may be arranged in separate regions 24 of turbulent airflow. The suction openings 20 may then be arranged spaced apart from each other. However, if the region 24 of turbulent airflow covers an extended area on the flow surface 11, the suction openings 20 may also be arranged spaced apart from each other in that region 24 of turbulent airflow.

Each manifold section 16 may comprise a region 24 of turbulent airflow being associated to that manifold section 16 in the one-to-one manner. This means one manifold section 16 comprises its associated region 24 of turbulent airflow. Any suction duct 28 or suction opening 20 which is associated to that manifold section 16 may be arranged in that associated region 24 of turbulent airflow.

The cross-sections of the suction ducts 28 at different positions 42, 44, and 46 being shown in FIG. 1 may be adapted to the local pressure at those positions. For example, if it is assumed that at position 42 a higher pressure is present than at position 44 and/or 46, the cross-section of the suction duct at position 42 may be smaller than the cross-section of the suction duct at positions 44 and/or 46. Since the suction force being provided by the suction opening 20 will be higher at the position 42 than the suction force being provided by the suction openings 20 at the position 44 and 46.

By considering the local pressure at the positions of the suction openings 20 during flight, the cross-section of the suction ducts 28 may be adapted to that local pressure. This may result in an optimized cross-section of the suction duct 28 causing an optimized air flow through the openings 32 to provide a required suction at those openings 32 to laminarise of the airstream at the perforated area.

Figure 3:
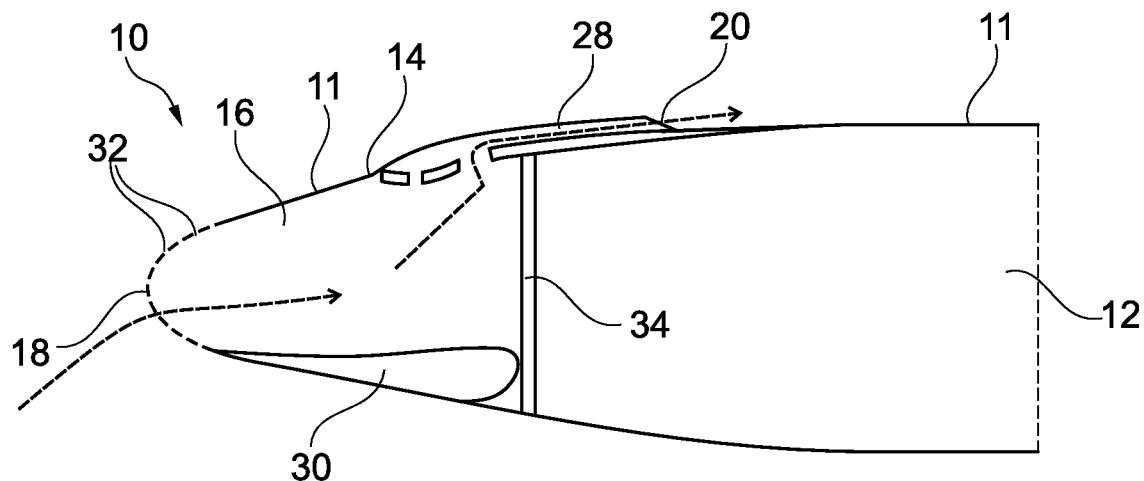
FIG. 3 shows a vertical cross-section of the flow body shown in FIG. 1.

FIG. 3 shows a vertical cross-section of the flow body 10 of FIG. 1 which may be an aircraft wing 12. The cross-section of the flow body 10 shows the flow surface 11 and a manifold section 16 of the manifold 14 being interior the flow body 10. The manifold 14 is delimited by a front spar 34 and the skin of the aircraft wing comprising the flow surface 11. A part of the flow surface 11 comprises the at least one perforated area comprising the plurality of openings 32 extending through the flow surface 11.

The suction duct 28 connects the suction opening 22 of the manifold section 16. The suction duct 28 is arranged on the flow surface 11 such that the suction duct 28 protrudes from the flow surface 11.

FIG. 3 shows arrows which denote the flow of air through the openings 32 in the perforated area, the manifold section 16, the suction duct 28 and the suction opening 20.

Furthermore, the manifold section 16 comprises a lift enhancement device 30 which may for example be a Krueger lift enhancement device. The lift enhancement device 30 maybe pivoted such that it opens the manifold section 16. In this case, the opening being provided by the pivoted lift enhancement device 30 may cause a further flow of air into the manifold section 16.

Figure 4:
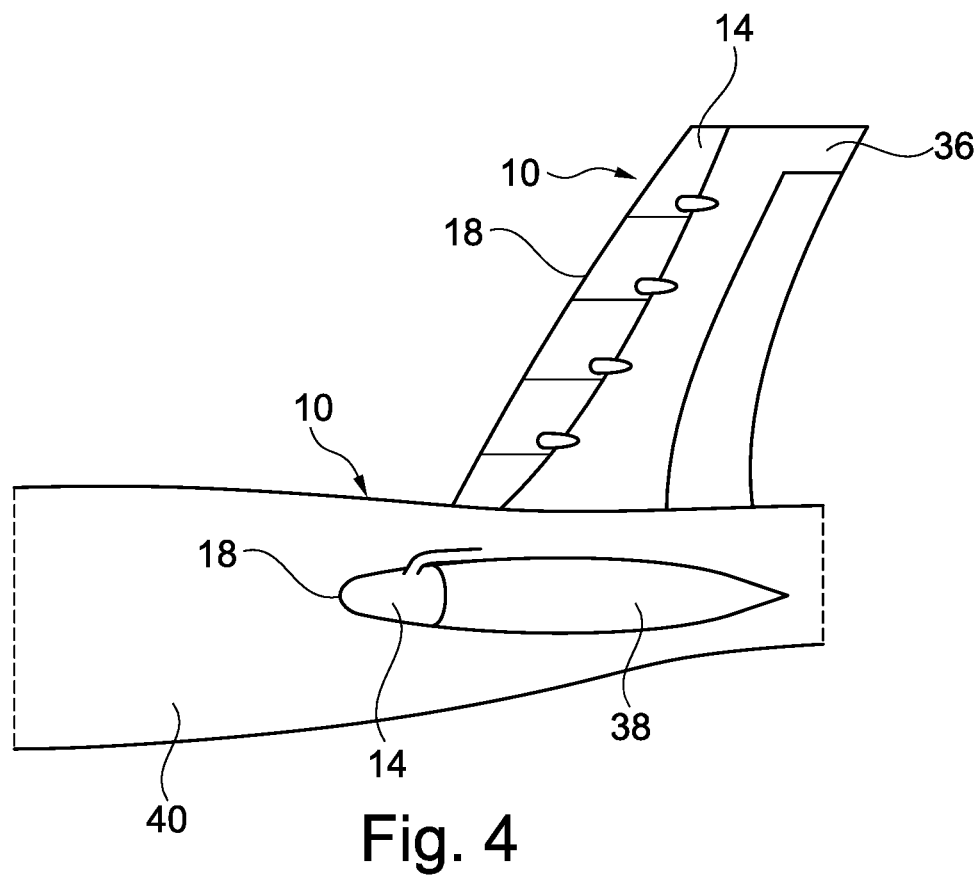
FIG. 4 shows a tail of an aircraft with a flow body on a horizontal tailplane and a vertical tailplane.

FIG. 4 shows further examples of flow bodies 10.

The flow body 10 may be a vertical tailplane 36. The vertical tailplane may comprise the manifold 14 at the leading-edge 18.

In another example, the flow body 10 may be a horizontal tailplane 38, wherein the manifold 14 may be arranged at the leading edge 18 of the horizontal tailplane 38.

Figure 5:
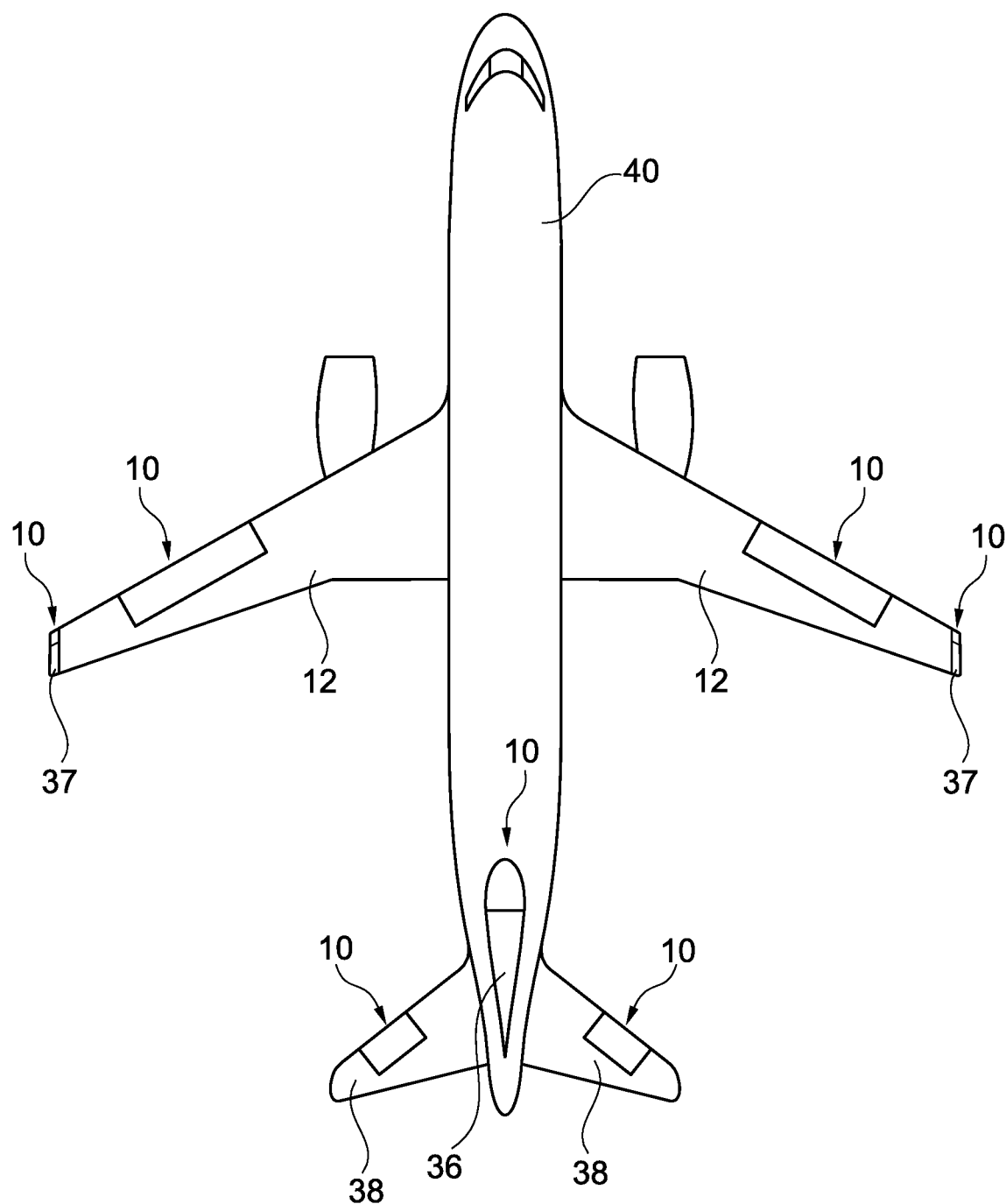
FIG. 5 shows an aircraft comprising flow bodies at different lift producing elements.

FIG. 5 shows an aircraft 40 comprising a plurality of flow bodies 10. The flow bodies 10 may be the wing 12, the winglet 37, the vertical tailplane 36 and/or the horizontal tailplane 38. Furthermore, the flow body 10 may be any further element of the aircraft 40 which requires a control of the laminar flow of the airstream.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flow body of an aircraft, comprising:
a flow surface exposed to an airstream during flight of the aircraft, the flow surface generating at least one region of turbulent airflow during flight of the aircraft;
at least one perforated area comprising a plurality of openings extending through the flow surface,
a manifold positioned interior to the flow surface in fluid communication with the openings; and
at least one suction duct having a first end and a second end, the first end in fluid communication with the manifold, the second end comprising a suction opening in the flow surface and arranged in the at least one region of turbulent airflow,
wherein the suction opening is adapted for inducing a suction force in the at least one suction duct when the flow surface is exposed to an airstream during flight, thereby inducing a flow of air from through the plurality of openings,
wherein the flow body is an aerofoil including one or more of an aircraft wing, a winglet, a vertical tailplane, or horizontal tailplane,
wherein the aerofoil is an aircraft wing comprising a lift enhancement device configured to be arranged in the manifold, and
wherein the lift enhancement device is a Krueger lift enhancement device.

2. The flow body according to claim 1, wherein the flow body comprises a plurality of suction ducts.

3. The flow body according to claim 2, wherein the flow surface generates a plurality of regions of turbulent airflow during flight of the aircraft spaced apart from each other and wherein each of the plurality of suction ducts is arranged in a separate region of the plurality of regions of turbulent airflow.

4. The flow body according to claim 3, wherein the manifold comprises a plurality of manifold sections, wherein each of the plurality of manifold sections is arranged on a separate portion of the at least one perforated area.

5. The flow body according to claim 4, wherein the plurality of suction ducts and the plurality of manifold sections are associated to each other in a one-to-one ratio.

6. The flow body according to claim 4, wherein the manifold sections are separated by walls.

7. The flow body according to claim 6, wherein the walls provide an airtight sealing between the manifold sections.

8. The flow body according to claim 1, wherein each of the at least one suction duct comprises a cross section adapted to a pressure value at a position of the suction opening in the region of turbulent airflow.

9. The flow body according to claim 1, wherein the flow surface comprises a turbulence generating structure configured to generate the at least one region of turbulent airflow.

10. The flow body according to claim 1, wherein the flow body comprises a leading edge facing the airstream during flight, wherein the at least one perforated area is arranged at the leading edge.

11. An aircraft comprising at least one flow body according to claim 1.

* * * * *